US007633472B2

(12) United States Patent
Edwards

(10) Patent No.: US 7,633,472 B2
(45) Date of Patent: Dec. 15, 2009

(54) ACTIVE MATRIX DISPLAY DEVICES

(75) Inventor: Martin J. Edwards, Crawley (GB)

(73) Assignee: Chi Mei Optoelectronics Corporation, Tainan (TW)

( * ) Notice: Subject to any disclaimer, the term of this patent is extended or adjusted under 35 U.S.C. 154(b) by 504 days.

(21) Appl. No.: 10/528,255

(22) PCT Filed: Sep. 12, 2003

(86) PCT No.: PCT/IB03/03974

§ 371 (c)(1),
(2), (4) Date: Mar. 17, 2005

(87) PCT Pub. No.: WO2004/027748

PCT Pub. Date: Apr. 1, 2004

(65) Prior Publication Data

US 2005/0200788 A1 Sep. 15, 2005

(30) Foreign Application Priority Data

Sep. 23, 2002 (GB) ................................ 0222039.0
Mar. 12, 2003 (GB) ................................ 0305634.8

(51) Int. Cl.
*G02F 1/1343* (2006.01)

(52) U.S. Cl. .......................... 345/87; 345/204; 349/139

(58) Field of Classification Search .................. 345/87, 345/100, 204; 349/139
See application file for complete search history.

(56) References Cited

U.S. PATENT DOCUMENTS 5,448,258 A * 9/1995 Edwards ...................... 345/90
5,923,311 A * 7/1999 Edwards ...................... 345/92
5,977,940 A * 11/1999 Akiyama et al. ............. 345/94
6,075,505 A * 6/2000 Shiba et al. .................. 345/87
6,738,031 B2 * 5/2004 Young et al. .................. 345/55
6,795,050 B1 * 9/2004 Ino et al. .................... 345/100
7,173,612 B2 * 2/2007 Nanno et al. ................ 345/211
7,230,597 B2 * 6/2007 Edwards et al. ............... 345/87

(Continued)

FOREIGN PATENT DOCUMENTS

EP 0 597 536 5/1994

(Continued)

*Primary Examiner*—Amare Mengistu
*Assistant Examiner*—Afroza Y Chowdhury
(74) *Attorney, Agent, or Firm*—Fish & Richardson P.C.

(57) ABSTRACT

In an active matrix display device, such as AMLCD, having an array of pixels (P) addressed via sets of row and column conductors (14, 15) to which, respectively, selection and data signals are applied, each pixel comprises a plurality of sub pixels (P1-P4) which each have an associated switch, for example a TFT, (T1-T4) and which are addressed with data signals through a common switch (T1) coupled to a column conductor (15). Addressing the sub pixels through a common switch reduces the effective capacitance of the column conductor. By appropriate control of the switches (T1-T4) the pixels can be driven in a first mode in which the common switch (T1) is operated to control the simultaneous addressing of the sub pixels (P1-P4) with a data signal, for example, for a video display with full grey scale capability, and in a second mode in which the switches (T1-T4) are controlled sequentially to allow different data signals to be applied to the individual sub pixels, for example, as required for a low power standby mode of operation with limited grey scale and color capability.

32 Claims, 7 Drawing Sheets

U.S. PATENT DOCUMENTS

2001/0052597 A1* 12/2001 Young et al. .................. 257/59
2002/0018056 A1* 2/2002 Ozawa et al. ............... 345/204
2002/0044109 A1* 4/2002 Kimura ....................... 345/76
2002/0047822 A1* 4/2002 Senda et al. .................. 345/90
2002/0075211 A1* 6/2002 Nakamura ................... 345/87
2002/0113872 A1* 8/2002 Kinjo ......................... 348/116
2002/0140364 A1* 10/2002 Inukai ..................... 315/169.3
2004/0113872 A1* 6/2004 Nanno et al. .................. 345/76

FOREIGN PATENT DOCUMENTS

| | | |
|---|---|---|
| EP | 0 293 048 | 11/1998 |
| EP | 1 158 482 | 11/2001 |
| JP | 3053218 | 3/1991 |
| JP | 5265045 | 10/1993 |

* cited by examiner

ACTIVE MATRIX DISPLAY DEVICES

This application is a 371 of PCT/IB03/03974 Sep. 12, 2003

This invention relates to active matrix electro-optic display devices comprising an array of pixels addressed via sets of address conductors, and particularly to active matrix liquid crystal display devices (AMLCDs). The invention is concerned more especially with active matrix display device circuit arrangements and methods of operation for addressing groups of two or more sub-pixels within the array.

Conventionally, AMLCDs comprise a row and column array of pixels which are connected to, and addressed via, sets of row and column address conductors. The pixels of one row are usually connected to the same row address conductor while each pixel in the row is connected to a respective, and different, column address conductor. An example of such a device, its method of operation, and its method of fabrication are described in U.S. Pat. No. 5,130,829 to which reference is invited and whose contents are incorporated herein.

Such display devices are widely used in a variety of products, including for example lap-top computers, PDAs and mobile phones and other portable electronic equipment. Full colour display devices are now becoming more common in relatively small products such as mobile phones. Also, for portability, these products tend to rely on batteries for their power.

It is desirable for display devices intended for use in mobile phone applications and the like to have a very low power consumption in order to conserve battery power. However, there is increasing interest in integrating video functions into mobile devices which means that they must also have good grey scale capability. It is difficult to satisfy both of these requirements at the same time and therefore display devices have been proposed which can be operated in two different modes, a relatively high power, full grey scale, mode and a low power mode which has reduced grey scale capability.

One technique for reducing the power consumption of the display device is to operate it in an 8 colour mode in which the red, green and blue pixels of the display device are driven to one of two states, a light state in which the light transmission, or reflection, of the pixel is high and a dark state in which the light transmission, or reflection, is low. This method of operating the display device offers a reduced power consumption because the circuitry, such as digital to analogue converters, which is required to generate the drive voltages for the grey scales can be put into an inactive, low power, state.

This low power operating mode can be extended to offer increased grey scale and colour capability by dividing the pixels of the display into sub pixels. These sub pixels can be given different areas, for example a pixel may consist of two sub pixels one having an area A and a second having an area 2A. By independently driving these sub pixels to the dark state or the light state the display can be operated to produce 64 colours and 4 grey levels with only a moderate increase in power consumption compared to the 8 colour operation.

Examples of AMLCDs using this area-ratio grey-scale sub-pixellation approach are described, for example, in U.S. Pat. No. 6,335,778 B1 and U.S. 2002/0047822A1, whose contents are incorporated herein as reference material.

Dividing each pixel into a number of sub pixels raises the issue as to how these additional sub pixels should be addressed. FIG. 1 illustrates one approach to addressing the additional sub pixels, similar to the kind of approach described in U.S. 2002/0047822A1, in which each sub pixel, P1 to P4, of a pixel P is addressed in a similar way to a conventional pixel. A respective TFT (Thin Film Transistor) is connected between each sub-pixel and a common, adjacent, column address conductor 15 associated with column m of the array. Additional row address conductors 14 are provided, making four in total, Row n to Row n+3, so that each sub pixel can be separately addressed with drive voltages applied to the column conductor. Examples of the row addressing waveforms required are shown in FIG. 1*a*. The address period for the four sub pixels is divided into four sections during each of which a row selection signal is applied to a respective row address conductor to turn on the associated TFT and simultaneously a data voltage signal is applied to the column address conductor charge the associated sub pixel. A disadvantage of this addressing technique is that the capacitance of the column conductor will be increased by both the capacitance of the additional TFTs connected to it and the capacitance of the crossovers with the additional row conductors. The increased capacitance leads to an increase in power consumption. Other problems, such as the need to use enlarged components in the column drive circuit can also arise.

It is an object of the present invention to provide improved circuit arrangements for the pixels, and methods of operating such, enabling addressing of groups of two or more sub pixels. It is a further object to provide circuit arrangements which are compatible with operation of the display device in a low power stand by mode with reduced colour and grey-scale capability, for example 64 colours, and in a video mode with a full grey scale capability.

In accordance with an aspect of the present invention, there is provided an active matrix display device comprising an array of pixels, a set of row conductors through which rows of pixels are selected, a set of column conductors through which data signals are supplied to selected pixels, each pixel comprising a plurality of sub pixels which sub pixels are each associated with a respective switching transistor for controlling the supply of a data signal to the sub pixel, wherein the plurality of sub pixels of a pixel are coupled to a column conductor associated with the pixel via a common switching transistor through which data signals are supplied to the sub pixels, and wherein the device is operable in a first mode in which the plurality of sub-pixels of a pixel are addressed simultaneously with a data signal and in a second mode in which the sub pixels of a pixel are addressed individually with respective data signals.

The manner in which the sub pixels are connected, with all the sub pixels of a pixel being addressed via one TFT that is connected to the column conductor, has the advantage that the capacitance of the column address conductor is significantly reduced compared to the arrangement of FIG. 1. When the display device is operated in the video mode this common TFT can be used to control the simultaneous charging of the sub pixels. In the low power operating mode the additional TFTs associated with the sub pixels can be used to allow different data to be applied to the sub pixels.

The sub pixels of a pixel may conveniently be connected in a serial or parallel manner.

For ease of controlling the switching transistors and enabling readily the operation of the pixels in the first and second modes, the switching transistors associated with the sub pixels of a pixel are preferably connected to respective, different, row conductors.

The invention is particularly advantageous in relation to AMLCDs, in which the sub pixels comprise liquid crystal display elements, but may be used in active matrix display devices using other kinds of display elements, for example electrophoretic display elements.

These and other advantageous features in accordance with the present invention are illustrated specifically in embodiments of various and different aspects of the invention now to be described, by way of example, with reference to the accompanying drawings, in which:—

FIG. 1 shows schematically a possible circuit of a typical pixel, comprising a plurality of sub pixels, in an AMLCD.

FIG. 1*a* shows schematically example waveforms for operating the AMLCD of FIG. 1;

The same reference numbers and symbols are used throughout the Figures to denote the same or similar parts.

Figure 1:
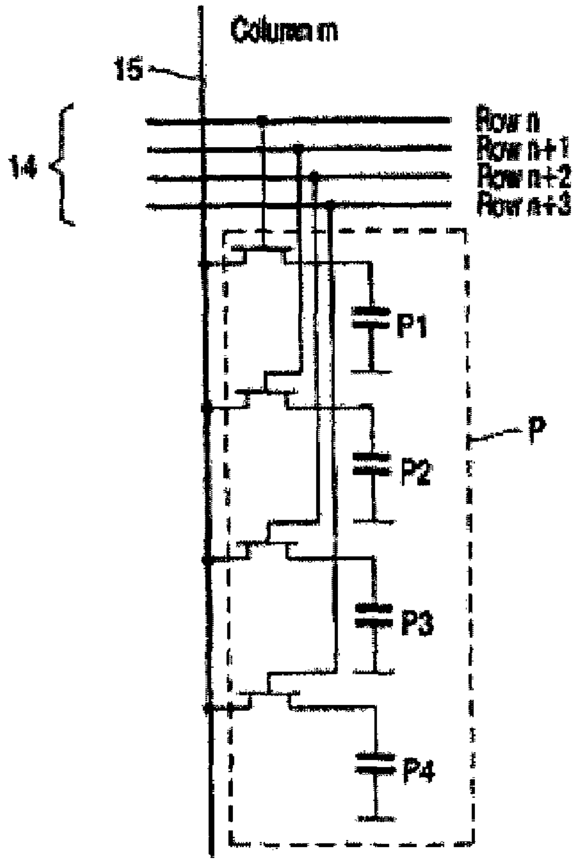
FIG.1 (PRIOR ART)
Figure 1A:
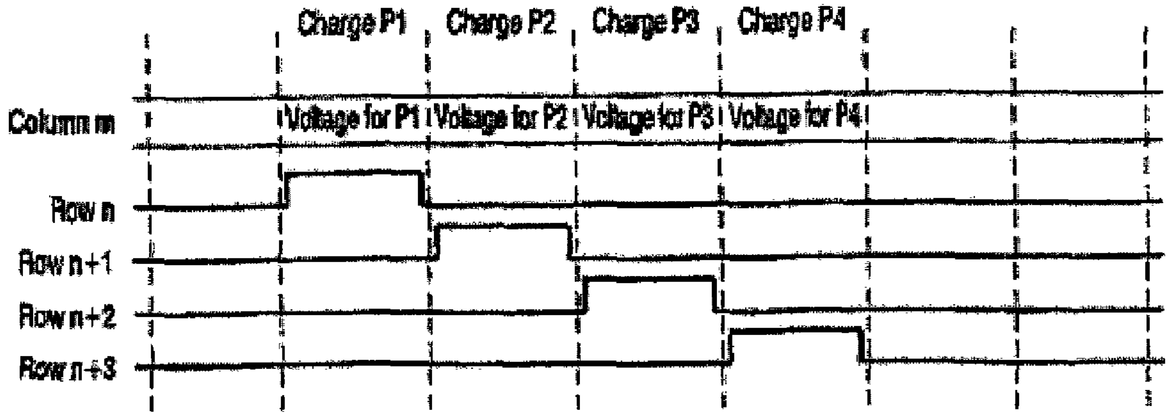
FIG.1a (PRIOR ART)
Figure 2:
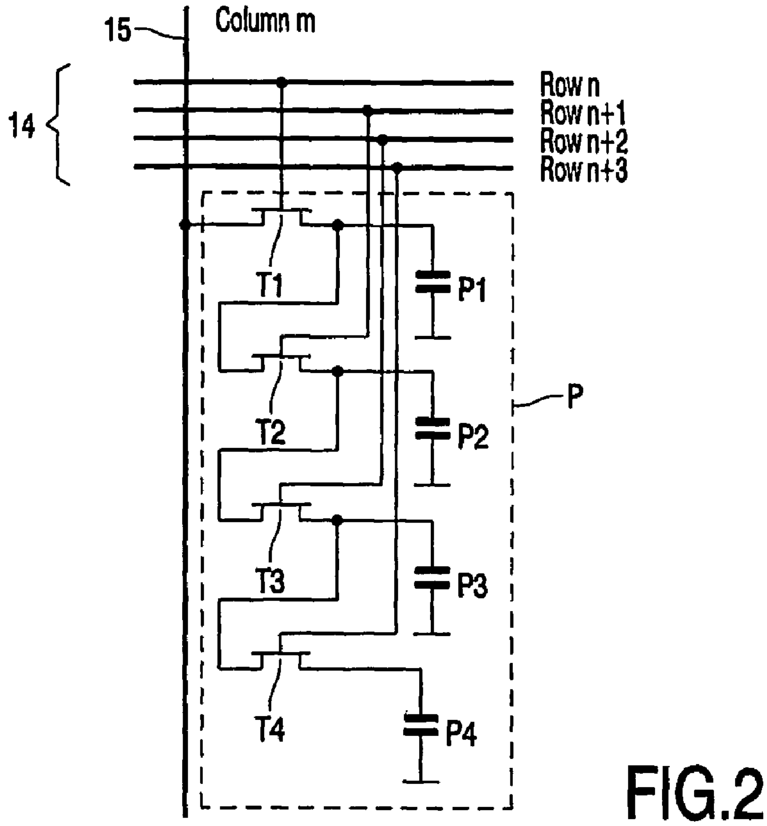
FIG. 2 shows schematically the circuit configuration of a typical pixel, comprising a plurality of sub pixels, in an embodiment of AMLCD according to the present invention.

Referring to FIG. 2, there is shown a part of a first embodiment of AMLCD in accordance with the invention, comprising a typical pixel P consisting of a plurality, in this case four, sub pixels, P1-P4, each having an associated TFT switch, T1-T4.

The group of sub pixels constituting the pixel P are connected in a serial manner. Each sub pixel P1 to P4 is connected to the output terminal of a respective TFT switch T1 to T4 with the input terminal of the TFT switches T2 to T4 being connected to the preceding sub pixel. The input of the TFT switch T1 associated with the first sub pixel, P1, is connected to the associated column conductor 15 associated with column m of the array. Data voltage signals for each of the sub pixels P1-P4 are supplied through this single column conductor and the TFT T1 which for this purpose is common to all sub pixels P1-P4. Each TFT switch T1-T4 has a separate switching control (gating) signal which is supplied via a respective, different row conductor 14, Row n-Row n+3, to which its control (gate) electrode is connected.

Figure 3:
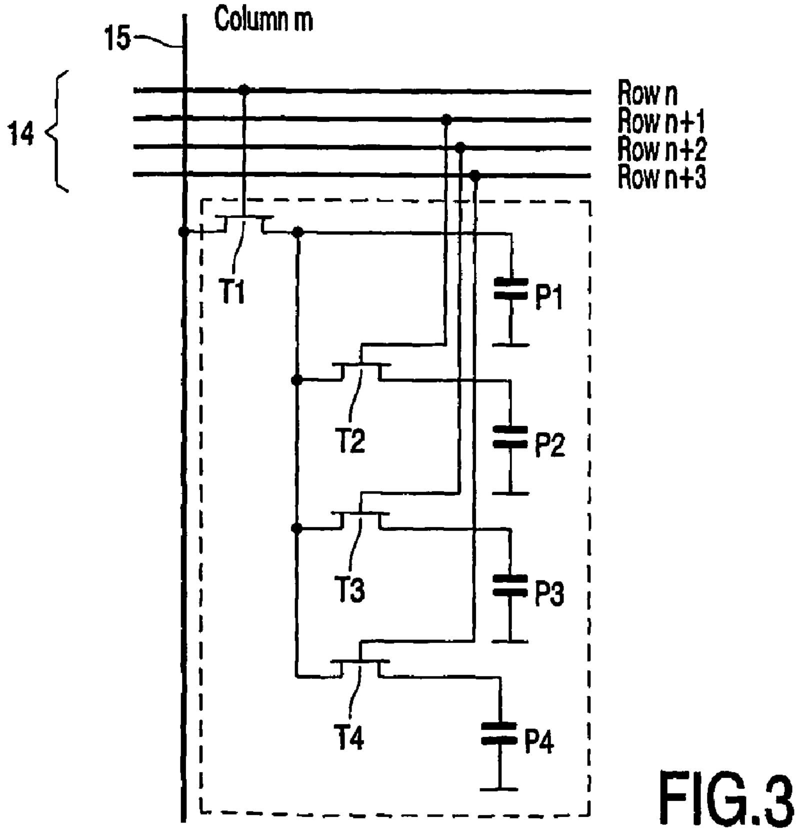
FIG. 3 shows schematically the circuit configuration of a typical pixel, comprising a plurality of sub pixels, in another embodiment of AMLCD according to the present invention.

In the second example embodiment illustrated in FIG. 3, the group of sub pixels P1-P4 of the pixel P are connected in a parallel manner. Again each sub pixel P1 to P4 is connected to the output terminal of a switching TFT T1-T4 but in this case the input terminals of all TFTs except that associated with the first sub pixel P1 are connected to the first sub pixel, P1. As before each TFT has a separate control signal supplied via a respective and different row conductor 14, Row n-Row n+3, to which its control (gate) electrode is connected. Again TFT T1 is common to all sub pixels P1-P4 in that they all receive their data signals through this TFT.

In both example embodiments, the number of sub-pixels in each pixel group can, of course, be varied.

It will be appreciated that for each pixel only one TFT, the common TFT, is connected directly to the column conductor. Consequently, the capacitance of the column conductor is considerably reduced compared with the known arrangement in which each sub pixel TFT is connected to the column conductor.

Both of these pixel circuit configurations have the further advantage that they can readily be addressed in the two modes which correspond to the low power mode and video mode described previously.

In the low power mode of operation different video information must be is applied to each of the sub pixels. This is achieved by supplying the information in the form of data voltage signals sequentially to the column conductor and by applying appropriate switching waveforms to the row conductors. The switching waveforms required by the two example circuits of FIGS. 2 and 3 are different and are illustrated in FIGS. 4 and 5, respectively.

Figure 4:
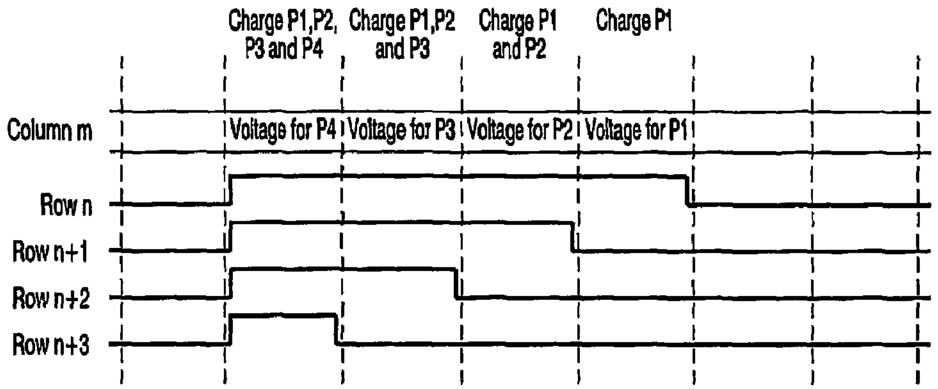
FIGS. 4 and 5 illustrate schematically waveforms used in the driving of the devices of FIGS. 2 and 3 respectively.

In the case of the first example embodiment of FIGS. 2 and 4, the sub pixels P1-P4 are charged sequentially, starting with P4 and ending with P1. This is achieved by using the overlapping row addressing, (switching), pulses shown in FIG. 4 to control the TFTs T1-T4 appropriately. Each of the TFTs T1-T4 is turned on for a period corresponding to that of the row addressing pulse on its associated row conductor, Row n-Row n+3, allowing the signal present on the column conductor to pass therethrough. As shown, the timings of the row addressing pulses applied to the row conductors Row n-Row n+3 are such that in a first part of a row address period, in which the sub pixels of a row of pixels are all addressed, a data signal applied to the column conductor and intended for sub pixel P4 is transferred through all the TFTs to that sub pixel (and all other sub pixels). At the end of this first period, the TFT T4 is turned off and the data signal is stored on sub pixel P4. In a following period, a data signal intended for sub pixel P3 is applied which is transferred through TFTs T1 to T3 to that sub pixel and stored thereon at the termination of the row addressing pulse applied to Row n+2. The remaining sub pixels are addressed similar manner in subsequent address intervals with sub pixel P1 being the last to be addressed with its intended data signal. At the termination of the row addressing pulse applied to the row conductor Row n, therefore, each sub pixel is charged according to its relevant data signal.

Figure 5:
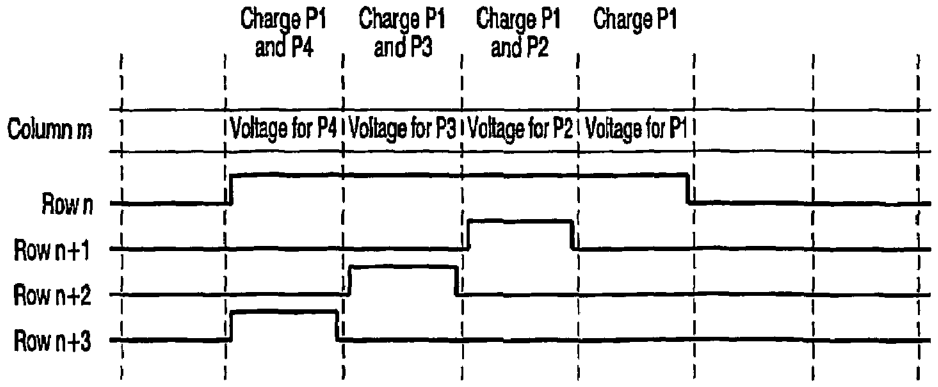

In the case of the second example embodiment of FIGS. 3 and 5, the TFT switches T2 to T4 associated with all sub pixels apart from the first are selected sequentially while the first TFT T1 is held in a conducting state. Finally, the first sub pixel P1 is charged and then the first TFT T1 is turned off. The row addressing pulse applied to Row n lasts for substantially all the row address period so as to hold TFT switch T1 on in this period and allowing data signals to be passed to sub pixels P2, P3 and P4 in respective sub-intervals in is which the TFTs T2, T3 and T4 are turned on, individually, by appropriate address pulses of their associated row conductors T2, T3 and T4, starting with TFT switch T4 in an initial period.

In the video mode of operation for both embodiments, the same drive, data, voltage signal is applied to all of the sub pixels P1 to P4. This is achieved by holding the associated row conductors, Rows n+1 to n+3, at a voltage which turns on the TFT switches T2 to T4. Row n is then driven with conventional row selection waveforms, the row voltage being switched to a select (gating) voltage level in order to turn on the TFT switch T1 connected to the column conductor and to charge all sub pixels P1-P4 simultaneously, and then returned to a non-select voltage level in order to turn off this TFT T1 and to isolate the sub pixels P1-P4 from the column electrode. The TFT switches T2 to T4 of all pixels in the array can be simply held on for the duration of this operational mode.

Figure 6:
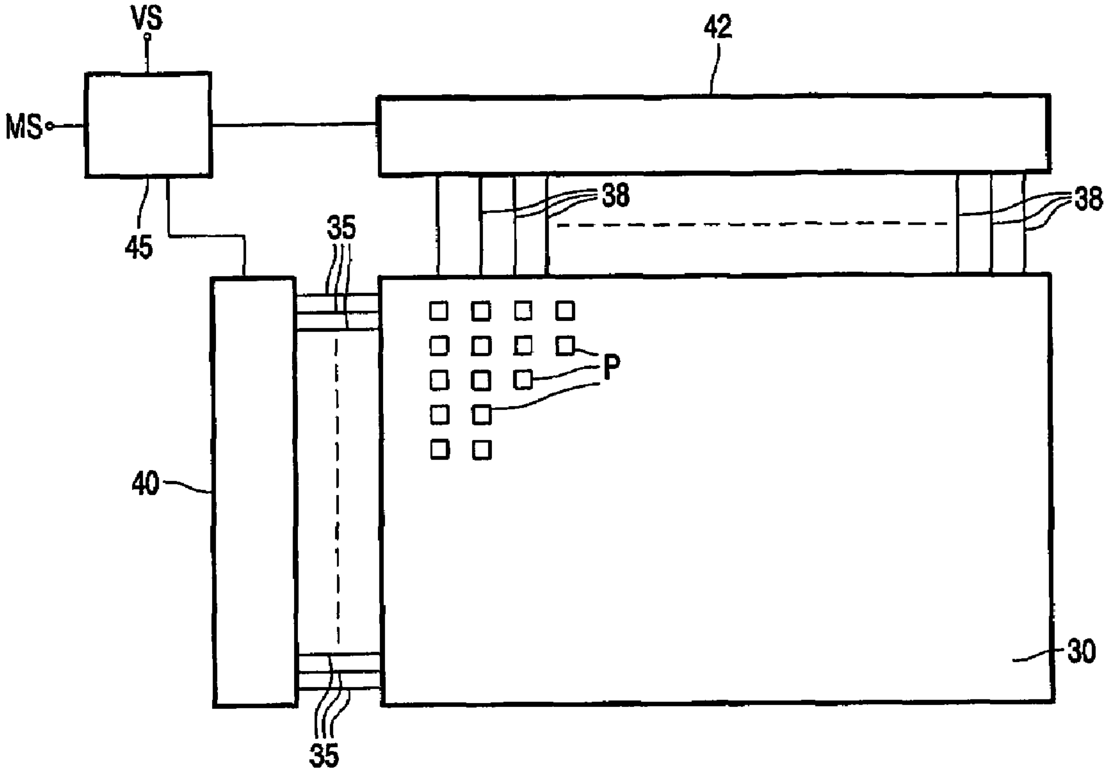
FIG. 6 shows schematically, and in highly simplified form, an AMLCD according to the invention.

With regard to both embodiments, the row address pulses applied to the row conductors and the data signals applied to the column conductors and supplied by peripheral drive circuits in generally conventional manner. FIG. 6 shows schematically a display device according to the invention and using pixels of the kind described above with reference to FIGS. 2 and 3. The pixels P, each comprising a plurality of sub pixels, are organised in rows and columns to form a display pixel array 30. Typically, there may be several hundred rows and columns of pixels. The pixels P in the same row share the same row conductor, 35, each row of pixels thus having four associated row conductors in the case of the above described examples, while the pixels P in the same column share the same column conductor, 38. The pixels are driven by peripheral drive circuitry comprising a row drive circuit 40 connected to the set of row conductors 35 and a column drive circuit 42 connected to the set of column conductors 38, the row and column drive circuits being arranged to provide the required row address pulses and data signals to the row conductors and column conductor associated with a pixel as described above. In a respective row address period the pixels in one row are all addressed at the same time, using common row address pulses applied to their associated sub-set of row conductors 35 and appropriate data signals applied to their respective column conductors 38. Each row of pixels is addressed in sequence in a respective row address period in a frame period and repetitively addressed in similar manner in successive frame periods. The operation of the row and column drive circuits 40 and 42 is controlled and synchronised by a timing and control circuit 45 to which is supplied a video signal VS containing video information from which the data signals required for the sub pixels are derived. The row drive circuit 40 comprises a digital shift register type circuit similar to conventional row drive circuits but suitably modified so as to provide in a row address period the necessary row address pulses to a sub-set of row conductors Row n-Row n+3 when addressing a row of pixels, as described previously with reference to FIG. 4 or 5. Likewise, although generally similar to conventional column drive circuits, column drive circuit 42 is appropriately modified to provide data signals to each column conductor 38 in the manner required for the previously described operation of the pixels. In addition, the row and column drive circuits are selectively controllable by the timing and control unit 45 in response to a mode selection control signal MS applied thereto so as to switch the manner of operation of these circuits between that required for a low power mode of operation of the pixels and that required for a video mode of operation of the pixels as previously discussed. The kind of modifications necessary to the row and column drive circuits for these purposes will be apparent to the skilled person.

As in conventional AMLCDs, the sets of address conductors 35 and 38, the TFTs T1-T4 of each pixel, and sub pixel electrodes defining the sub pixels P1-P4 of each pixel are all carried on a first substrate, for example of glass, which is spaced from a second substrate carrying a continuous electrode common to all sub pixels in the array, with liquid crystal disposed between the substrates. Using, for example, low temperature polysilicon thin film technology, the drive circuits 40 and 42 are preferably integrated on the first substrate and fabricated simultaneously with the active matrix circuit of the pixels.

Figure 7:
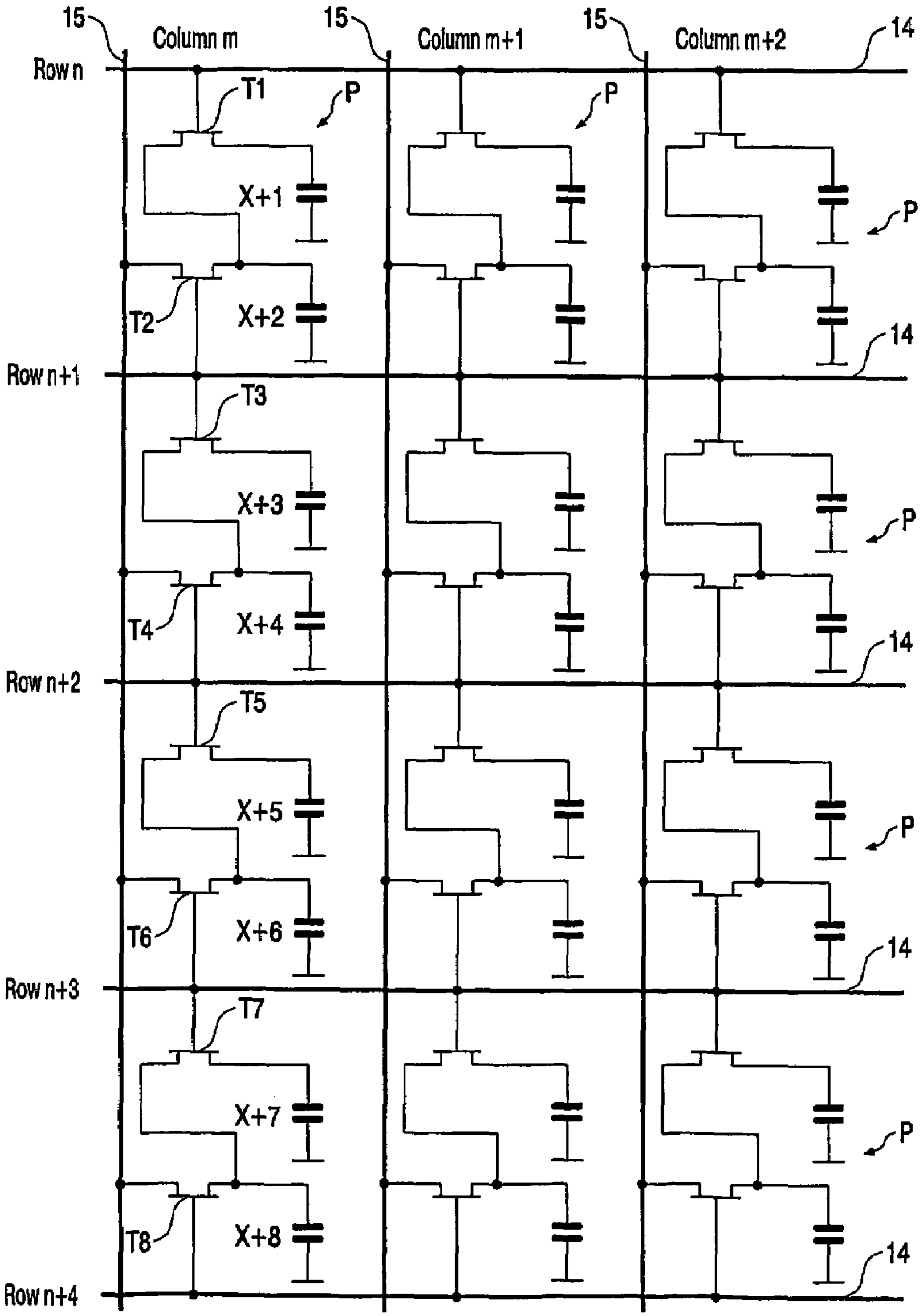
FIG. 7 shows schematically the circuit configuration of part of the pixel array, comprising a plurality of pixels in adjacent rows and columns, in a further embodiment of AMLCD in accordance with the present invention.

It is possible to reduce the number of row conductors required to address the display device by using a modified pixel circuit and modified row addressing waveforms. An example of part of an array which makes use of the addressing scheme proposed here is shown in FIG. 7. In this example pixels X+1 and X+2, X+3 and X+4, X+5 and X+6 etc. represent pairs of sub pixels in a display device which provides for a 64 colour low power operating mode by dividing the area of each pixel into two area ratioed sub pixels.

Considering, for example, the pixel comprising sub pixels x+1 and x+2, the TFT T1 associated with sub pixel x+1 is controlled by row addressing pulses on row conductor Row n while the TFT T2 associated with the sub pixel x+2 is controlled by row addressing pulses on the next row conductor, Row n+1. The input of the TFT T2 is connected to the column conductor Column m while the input of the TFT T1 is connected to the output of TFT T2, whereby a data signal for sub pixel x+2 is supplied via TFT T2 while a data signal for sub pixel x+1 is supplied via both TFTs T2 and T1. The following pixel in the same column, comprising sub pixels x+3 and x+4 is connected in a similar way with TFTs T3 and T4 associated with sub pixel x+3 and x+4 respectively being controlled by row address pulses on row conductors Row n+1 and Row n+2 and with the input of TFT T4 being connected to column conductor Column m and the input of TFT T3 being connected to the output of TFT T4. The remaining pixels in the same column are connected in similar manner. The pixels in other columns are arranged in corresponding manner, with the pixels in each column being connected to a respective, and different column conductor and with adjacent pairs of pixels each sharing a row conductor.

Figure 8:
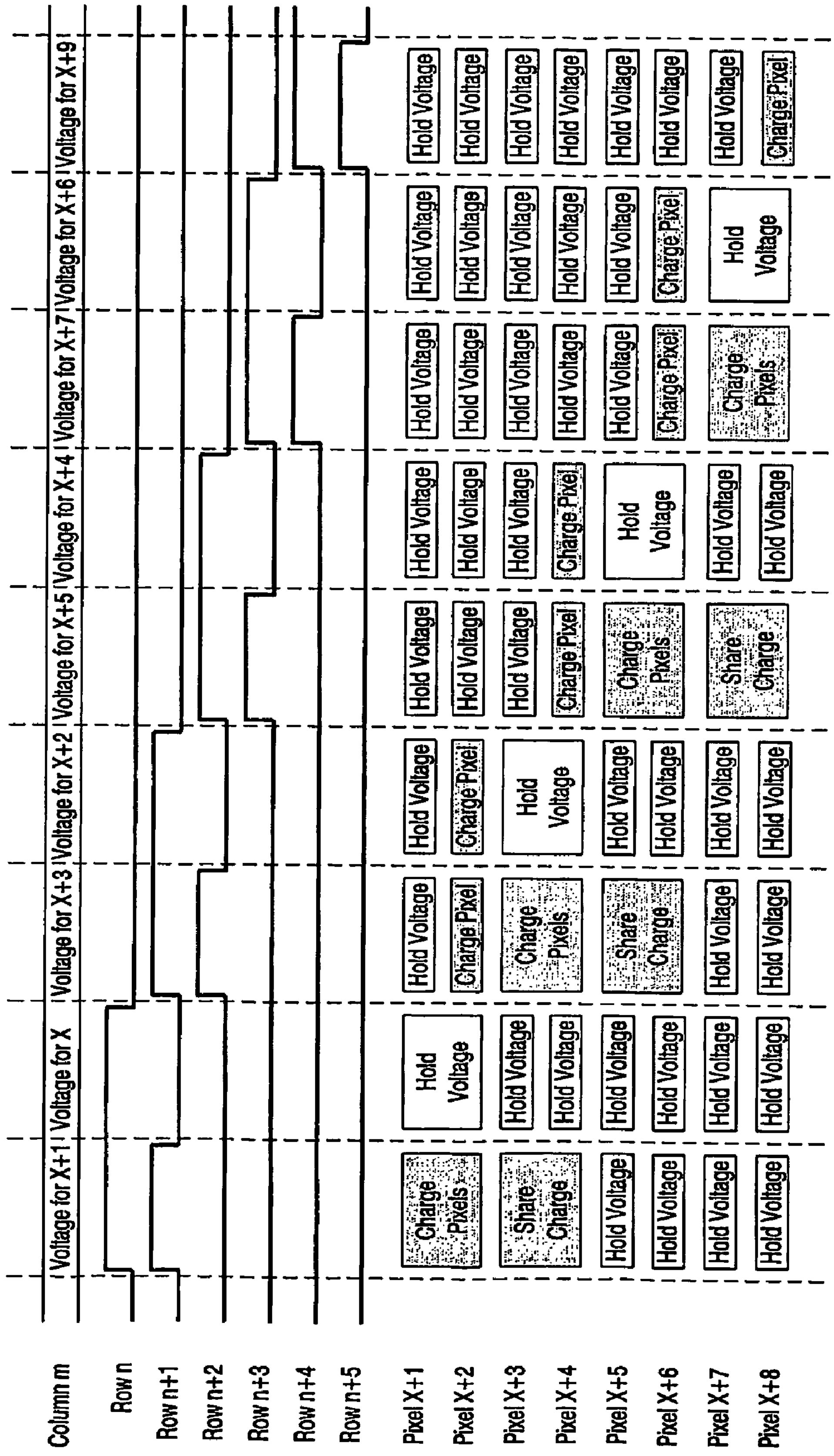
FIGS. 8 and 9 illustrate schematically waveforms used in the driving of the device of FIG. 7 and the effects on the pixels concerned in first and second modes of operation.

In the low power mode where the sub pixels must be addressed with different information, the array is scanned from top to bottom using the row addressing waveforms shown in FIG. 8 with the waveform labelled Row n being applied to row conductors Row n and so on. In order to address the sub pixels X+2, X+4, X+6, X+8 etc, the row conductor below the pixel must be taken to a select level. In order to address the sub pixels X+1, X+3, X+5, X+7 etc. both the row conductor above and the row conductor below the pixel must be taken to the select voltage level.

Since taking one of the row conductors to the select voltage level will affect both the row of pixels above and below the selected row conductor it is important that the rows are addressed in the correct sequence so that information applied to a particular sub pixel is not corrupted when a subsequent sub pixel is being addressed.

FIG. 8 indicates the operations that are being performed on each of the sub pixels during each period of the addressing sequence. There are three types of operation:

1) Charging, (labelled "Charge Pixels" in FIG. 8), when the sub pixel is connected to the column conductor via the switching TFTs and is charged to the voltage present on the column conductor.

2) Charge sharing, (labelled "Share Charge" in FIG. 8), when the TFT between a pair of the sub pixels is turned on and charge sharing takes place between the capacitances of the sub pixels, the sub pixels being isolated from the column conductor during this operation.

3) Holding, (labelled "Hold Voltage" in FIG. 8) when the voltage is maintained on the capacitance of the sub pixels.

As shown in FIG. 8, in a first sub-period of the illustrated addressing cycle row address pulses are applied to row conductors Row n and Row n+1 thereby turning on TFTs, T1, T2 and T3. At the same time a data signal voltage intended for sub pixel x+1 is applied to the column conductor column m, thus charging sub pixels x+1 and x+2. Because TFT T3 is also turned on in this sub-period, charge sharing occurs between sub pixels x+3 and x+4. In the following sub-period, the row address pulse on row conductor Row n only is maintained while a data signal intended for a preceding sub pixel x (not shown) is applied. During this sub-period the voltages on sub-pixels x+1 and x+2 are held. In the next sub-period the row address pulse on Row n is removed and row address pulses applied to Row n+1 and Row n+2, with a data signal intended for sub pixel x+3 applied to the column conductor.

This results in the voltage on sub pixel x+1 being held while the sub pixel x+2 is charged to this data signal level. At the same time charging of sub pixels x+3 and x+4 takes place while charge sharing between sub pixels x+5 and x+6 occurs. In the next sub-period the row address pulse on Row n+2 is removed while the row address pulse on Row N+1 is maintained. In this sub-period a data signal intended for sub pixel x+2 is applied to the column conductor. Thus, the voltage on sub pixel x+1 is still held while sub pixel x+2 is charged to the data signal level, and the voltage on sub pixels x+3 and x+4 is merely held. In the following sub-period, in which a data signal intended for sub pixel x+5 is applied to the column conductor, the address pulse on Row n+1 is removed, and address pulses applied to Row n+2 and Row n+3. This results in the voltages on sub pixels x+1, x+2 and x+3 being held, the charging of sub pixels x+4, x+5 and x+6, and charge sharing between sub pixels x+7 and x+8.

This manner of operation continues, as depicted in FIG. 8, until all the sub pixels in the column have been charged according to their intended data signals.

While FIG. 8 shows the manner in which the pixels in one column are addressed, it will be appreciated that the other columns of pixels are addressed in a similar way and at the same time.

The sequence in which the sub pixels are addressed is chosen so that after a sub pixel has been charged to the required drive voltage level, according to the supplied data signal voltage, it will not undergo any further charge sharing or charging operation until shortly before it is re-addressed in the following field period.

Figure 9:
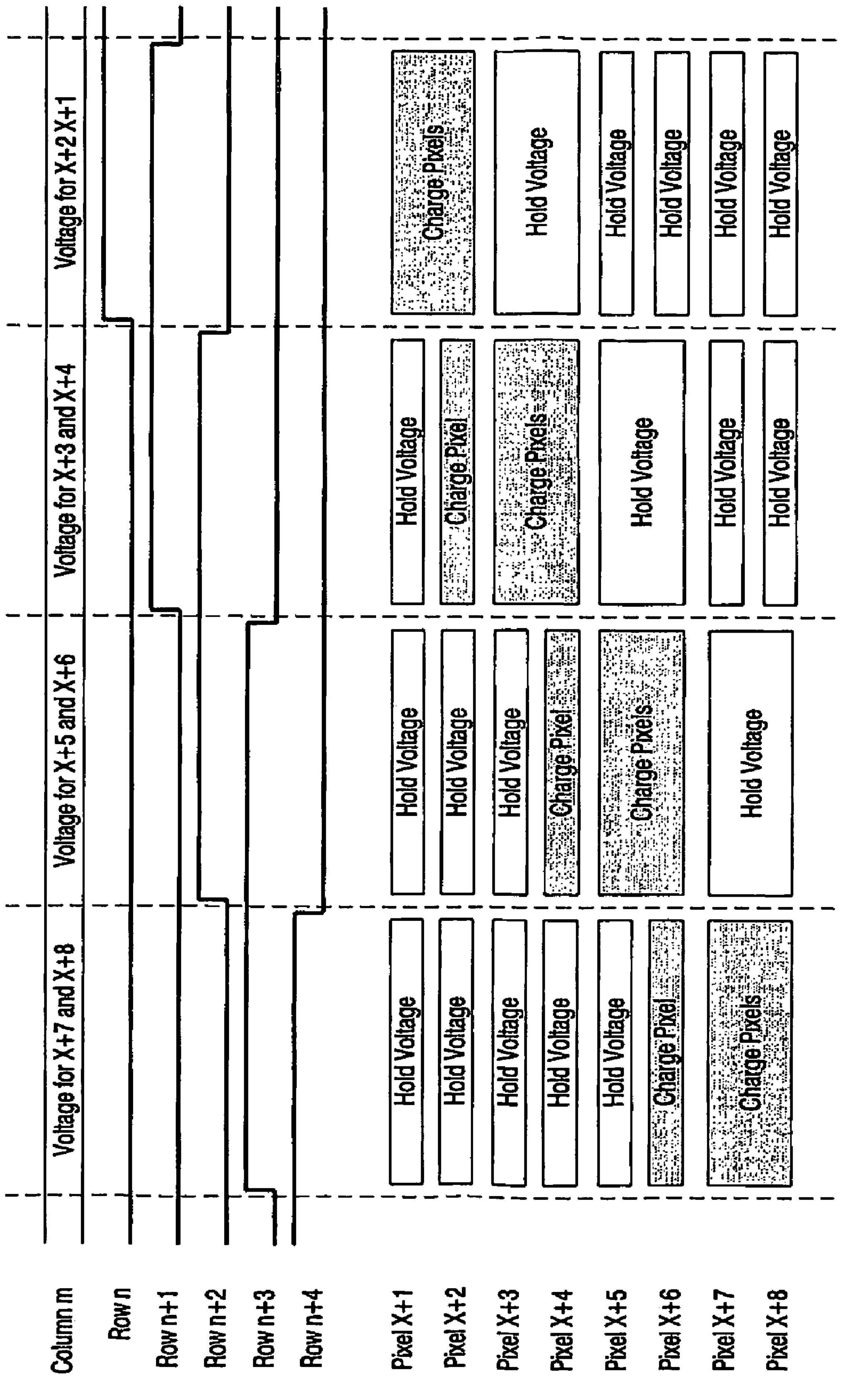

In the video operating mode the same video information must be applied to pairs of sub pixels. This is achieved using the addressing waveforms shown in FIG. 9. In this mode, the display device must be scanned in the reverse direction, from bottom to top, in order to avoid disturbing the pixel voltage after it has been addressed. Thus in a first sub-period of the illustrated addressing cycle, row address pulses are applied to Row n+3 and Row n+4 while a data signal voltage for sub pixels x+7 and x+8 is applied to the column conductor. Consequently, sub pixels x+6, x+7 and x+8 are all charged to the level of this data signal while the voltage on all other sub pixels in the column is held. In a following sub-period, a data signal intended for sub pixels x+5 and x+6 is applied and row address pulses applied only to Row n+3 and Row n+2, resulting in the voltage on sub pixels x+7 and x+8 being held, and sub pixels x+4, x+5 and x+6 being charged to the applied data signal level. This manner of operation continues, as depicted in FIG. 9, until all sub pixels have been addressed.

While described in relation to AMLCDs in particular, it is envisaged that the invention may be applied to active matrix display devices using electro-optic materials other than LC material, for example electrophoretic material.

In summary, therefore, active matrix display devices have been described which have an array of pixels addressed via sets of row and column conductors to which, respectively, selection and data signals are applied, each pixel comprises a plurality of sub pixels which each have an associated switch, for example a TFT, (T1-T4) and which are addressed with data signals through a common switch (T1) coupled to a column conductor. Addressing the sub pixels through a common switch reduces the effective capacitance of the column conductor.

By appropriate control of the switches (T1-T4) the pixels can be driven in a first mode in which the common switch (T1) is operated to control the simultaneous addressing of the sub pixels (P1-P4) with a data signal, for example, for a video display with full grey scale capability, and in a second mode in which the switches (T1-T4) are controlled sequentially to allow different data signals to be applied to the individual sub pixels, for example, as required for a low power standby mode of operation with limited grey scale and colour capability.

From reading the present disclosure, many other modifications will be apparent to persons skilled in the art. Such modifications may involve other features which are already known in the art and which may be used instead of or in addition to features already described herein.

The invention claimed is:

1. An active matrix display device comprising:

an array of pixels, a set of row conductors through which rows of pixels are selected, a set of column conductors through which data signals are supplied to selected pixels, each pixel comprising a plurality of sub pixels in which sub pixels are each associated with a respective switching transistor for controlling the supply of a data signal to the sub pixel, a timing and control unit for controlling a row drive circuit and a column drive circuit that provide driving signals and the data signals to the array of pixels, the timing and control unit selectively switching between a first mode of operation and a second mode of operation in response to a mode selection control signal, wherein the plurality of sub pixels of a pixel are coupled to a column conductor associated with the pixel via a common switching transistor through which data signals are supplied to the sub pixels, and wherein the device is selectively operable in the first mode in which the plurality of sub-pixels of a pixel are addressed simultaneously with a data signal and in the second mode in which the sub pixels of a pixel are addressed individually with respective data signals.

2. The display device according to claim 1, wherein the device comprises drive means for providing data signals to the column conductors and switching signals to the row conductors, and wherein the drive means is operable in the first mode to switch the switching transistors associated with the sub pixels of a pixel at the same time so as to supply a data signal on the associated column conductor to each sub pixel, and wherein the drive means is operable in the second mode to switch the switching transistors associated with the sub pixels of the pixel selectively in sequence such that data signals on the associated column conductor are supplied to respective sub pixels.

3. The display device according to claim 1, wherein the sub pixels of a pixel are connected in serial manner with the input terminal of the switching transistor associated with the first sub pixel of the series being connected to the associated column address conductor and with the input terminal of the switching transistor associated with each of the other sub pixels in the series being connected to the output terminal of the switching transistor associated with the preceding sub pixel in the series.

4. The display device according to claim 1, wherein the sub pixels of a pixel are connected in parallel manner with the input terminal of the switching transistor associated with one sub pixel being connected to the associated column address conductor and with the input terminals of the switching transistors associated with the other sub pixels being connected to the output terminal of the switching transistor associated with the one pixel.

5. The display device according to claim 1, wherein the control electrodes of the switching transistors associated with the sub pixels of a pixel are connected to respective different row conductors.

6. The display device according to claim 1, wherein each pixel comprises first and second sub pixels, wherein the control electrodes of the switching transistors associated with the first and second sub pixels of a pixel are connected to first and second row conductors respectively, wherein, for each pixel, the input of the switching transistor associated with the first sub pixel is connected to the associated column conductor and the input of the switching transistor associated with the second sub pixel is connected to the output of the switching transistor associated with the first sub pixel, wherein the first row conductor connected to one pixel is connected also to the control electrode of the switching transistor associated with the second sub pixel of another pixel connected to the associated column conductor, and wherein the second row conductor connected to the one pixel is connected also to the control electrode of the switching transistor associated with the first sub pixel of a further pixel connected to the associated column address conductor.

7. The display device according to claim 1, wherein the sub pixels comprise liquid crystal picture elements connected to the outputs of their associated switching transistor.

8. The display device according to claim 7, wherein at least two sub pixels of a pixel are of different areas.

9. The display device according to claim 1, wherein the common switching transistor corresponds to the respective switching transistor of one of the plurality of sub pixels.

10. The display device according to claim 1, wherein each of the common switching transistor and the respective switching transistors comprise an input terminal, an output terminal and a gate terminal, wherein the input terminal of the common switching transistor is connected to the column conductor associated with the pixel and the output terminal of the common switching transistor is connected to at least one of the input terminals of the respective switching transistors.

11. The display device according to claim 10, wherein the output terminal of the common switching transistor is connected to each of the input terminals of the respective switching transistors.

12. The display device according to claim 10, wherein the output terminal of a first one of the respective switching transistors is connected to the input terminal of a second one of the respective switching transistors.

13. The display device of claim 1, further comprising a timing and control unit, a row drive circuit and a column drive circuit that are operable in the first mode to switch the switching transistors associated with the sub pixels of a pixel at the same time so as to supply a data signal on the associated column conductor to each sub pixel, and wherein the timing and control unit, row drive circuit, and column drive circuit are operable in the second mode to switch the switching transistors associated with the sub pixels of the pixel selectively in sequence such that data signals on the associated column conductor are supplied to respective sub pixels.

14. The display device of claim 1 in which each sub pixel corresponds to a switching transistor and the switching transistor or transistors of a pixel other than the common switching transistor are turned on during the first mode of operation for a period of time longer than that during the second mode of operation.

15. The display device of claim 1, further comprising at least one digital-to-analog converter that provides a data signal to the plurality of sub-pixels of the pixel when the display device is operating in the first mode, and the at least one digital-to-analog converter is turned off when the display device is operating in the second mode.

16. The display device of claim 1 in which when the display device is operating in the first mode, the plurality of sub-pixels of a pixel are addressed simultaneously with a data signal having a level selectable from a first number of levels, and when the display device is operating in the second mode, the sub pixels of a pixel are addressed individually with respective data signals each having a level selectable from a second number of levels, the second number being smaller than the first number.

17. The display device of claim 16 in which the second number is equal to 2.

18. An active matrix device comprising:

a plurality of pixels, each pixel having at least two sub pixels;

a plurality of column conductors and a plurality of row conductors for addressing the pixels;

a first row conductor that controls a signal path between one of the pixels and one of the column conductors, the first row conductor controlling a signal path between two sub pixels of another pixel;

a second row conductor that controls a signal path between the other pixel and one of the column conductors; and a timing and control unit for controlling a row drive circuit and a column drive circuit that provide driving signals and the data signals to the plurality of pixels, the timing and control unit selectively switching between a first mode of operation and a second mode of operation in response to a mode selection control signal.

19. The active matrix device of claim 18, wherein the sub pixels of each pixel are ratioed.

20. The active matrix device of claim 19, wherein each pixel consists of two ratioed sub pixels.

21. An apparatus comprising:

an array of pixels in which each pixel comprises at least one pair of sub pixels;

column conductors each being connected to the pixels of one column of the array of pixels;

row conductors in which two or more of the row conductors are connected to the pixels of one row of the array of pixels, and some row conductors each being connected to two pixels in the same column; and a display controller for providing data signals to the column conductors and switching signals to the row conductors, the display controller being selectively operable in a first mode to switch the switching transistors associated with the sub pixels of a pixel at the same time so as to supply a data signal on the associated column conductor to each sub pixel, and the display controller being selectively operable in a second mode to switch the switching transistors associated with the sub pixels of the pixel selectively in sequence such that data signals on the associated column conductor are supplied to respective sub pixels;

wherein each of the pairs of sub pixels is associated with a circuit for connecting to a column conductor and two row conductors, the circuit comprising:

a first switching transistor with its input terminal connected to the column conductor, its output connected to the first sub pixel in the pair, and its control terminal connected to the first row conductor; and a second switching transistor with its input terminal connected to the output terminal of the first switching transistor, its output terminal connected to the second sub pixel in the pair, and its control terminal connected to the second row conductor.

22. The apparatus of claim 21, wherein at least two sub pixels of a pixel are of different areas.

23. The apparatus of claim 22, wherein the ratios of the areas of the sub pixels in a pixel are powers of two.

24. A method comprising:

driving a display device in a first mode in which a plurality of sub-pixels of each of an array of pixels of the display device are addressed simultaneously with a data signal; and driving a display device in a second mode in which the sub pixels of each pixel are addressed individually with respective data signals;

using a timing and control unit to control a row drive circuit and a column drive circuit that provide driving signals and the data signals to the array of pixels, the timing and control unit selectively switching between the first mode and the second mode in response to a mode selection control signal;

wherein the display device comprises a set of row conductors through which rows of pixels are selected, a set of column conductors through which data signals are supplied to selected pixels, and each sub pixel is associated with a respective switching transistor for controlling the supply of the data signal to the sub pixel.

25. The method of claim 24, further comprising selectively switching between the first mode and the second mode in response to a mode selection control signal.

26. The method of claim 24 in which driving the display device in the first mode comprises:

driving the voltage on all row conductors connected to gate terminals of switching transistors associated with each sub pixel of a pixel to a voltage level to turn on the switching transistors;

driving the voltage on a column conductor connected to the pixel to a level representing a data signal; and after the sub pixels of the pixel have been charged to a voltage corresponding to the voltage on the column conductor, driving the voltage on the row conductor connected to the gate terminal of a select transistor of the pixel to a voltage level to turn off the select transistor, wherein the select transistor is the only transistor in the pixel circuit that is directly connected to the column conductor.

27. The method of claim 26, wherein the data signal represents a grayscale value of a pixel in an image.

28. The method of claim 26, wherein the data signal represents a grayscale value of one color component of a pixel in an image.

29. The method of claim 26 in which driving the display device in the first mode comprises maintaining the voltage on the row conductor connected to the gate terminal or terminals of switching transistors other than the select transistor of the pixel at a level that turns on the switching transistors after the voltage on the row conductor connected to the gate terminal of the select transistor of the pixel is driven to a level that turns off the select transistor.

30. The method of claim 24 in which driving the display device in the second mode comprises:

driving the voltage on a row conductor connected to a gate terminal of a select transistor of a pixel to a voltage level to turn on the select transistor, wherein the select transistor is the only transistor in the pixel that is directly connected to the column conductor; and for each sub pixel in the pixel:

driving the voltage on row conductors connected to switching transistors, if any, that are located between the column conductor and the sub pixel to a voltage level that turns on the switching transistors;

driving the voltage on a column conductor connected to the pixel to a voltage level representing a light state or dark state for the sub pixel; and after the sub pixel has been charged to a voltage corresponding to the voltage on the column conductor, driving the voltage on the row conductor connected to the switching transistor associated with the sub pixel to a voltage level that turns off the switching transistor.

31. The method of claim 30, wherein the switching transistors of the target pixel are arranged in series, and wherein driving the display device in the second mode comprises initially driving the voltage on all row conductors connected to the target pixel to the logical on state and then driving the voltages on the row conductors to the logical off state one row conductor at a time as the sub pixels are charged in order from farthest from the column conductor to closest to the column conductor.

32. The method of claim 30, wherein the select transistor is the switching transistor associated with one of the sub pixels and that sub pixel is charged last.

* * * * *